(12) United States Patent
Lacson et al.

(10) Patent No.: US 12,058,225 B2
(45) Date of Patent: Aug. 6, 2024

(54) SYSTEM AND METHOD FOR EXTERNAL COMMUNICATIONS TO/FROM RADIOS IN A RADIO NETWORK

(71) Applicant: VoiceMe.AI, Inc., Tiburon, CA (US)

(72) Inventors: Francis G Lacson, Renton, WA (US); Ahmed Dilsher, Mountain View, CA (US); Kinuko Masaki, Tiburon, CA (US)

(73) Assignee: VoiceBrain, Inc., San Francisco, CA (US)

( * ) Notice: Subject to any disclaimer, the term of this patent is extended or adjusted under 35 U.S.C. 154(b) by 0 days.

(21) Appl. No.: 18/096,581

(22) Filed: Jan. 13, 2023

(65) Prior Publication Data
US 2024/0098159 A1 Mar. 21, 2024

Related U.S. Application Data

(60) Provisional application No. 63/408,618, filed on Sep. 21, 2022.

(51) Int. Cl.
*H04L 67/565* (2022.01)
*G06F 3/16* (2006.01)
(Continued)

(52) U.S. Cl.
CPC ............ *H04L 67/565* (2022.05); *G06F 3/162* (2013.01); *G10L 13/02* (2013.01); *G10L 15/26* (2013.01); *G10L 15/30* (2013.01); *G10L 19/173* (2013.01)

(58) Field of Classification Search
CPC ... H04L 65/4061; H04L 67/565; G06F 3/162; G10L 13/02; G10L 15/26; G10L 15/30; G10L 19/173
See application file for complete search history.

(56) References Cited

U.S. PATENT DOCUMENTS

| 8,995,974 B2 * | 3/2015 | Engelhart, Sr. ......... H04W 4/14 379/88.16 |
| 10,425,467 B1 * | 9/2019 | Buijsman .............. H04L 51/224 |

(Continued)

FOREIGN PATENT DOCUMENTS

WO    WO2019/024719 A1    2/2019

OTHER PUBLICATIONS

International search report and written opinion for PCT/US2021/014259.

*Primary Examiner* — Nicholas R Taylor
*Assistant Examiner* — Angela Widhalm De Rodriguez
(74) *Attorney, Agent, or Firm* — AWA Sweden AB; Thomas L. Ewing

(57) ABSTRACT

Embodiments of the invention provide a system and method that enables multiple networks themselves based on different underlying technologies to be combined into a larger network that provides seamless communications between a plurality of communication networks. For example, embodiments of the invention enable users in a radio network (e.g., push-to-talk radio systems) to broadcast messages to users in a non-radio network (e.g., users on personal computers or mobile phones) with the radio message translated into text for transmission to the non-radio network. Similarly, text messages originating from users in a non-radio network (e.g., users on personal computers or mobile phones) may be communicated to users in radio networks with the text messages translated into audio for broadcast on the radio network.

18 Claims, 5 Drawing Sheets

(51) Int. Cl.
*G10L 13/02* (2013.01)
*G10L 15/26* (2006.01)
*G10L 15/30* (2013.01)
*G10L 19/16* (2013.01)

(56) References Cited

U.S. PATENT DOCUMENTS

| | | | |
|---|---|---|---|
| 11,012,551 B2* | 5/2021 | Sun | H04B 17/318 |
| 2005/0143017 A1* | 6/2005 | Lopp | H04M 1/725 |
| | | | 455/74.1 |
| 2007/0139513 A1* | 6/2007 | Fang | H04N 7/142 |
| | | | 348/14.01 |
| 2007/0242424 A1* | 10/2007 | Lieu | H04M 1/0256 |
| | | | 361/679.42 |
| 2009/0144060 A1* | 6/2009 | Groeger | G10L 13/00 |
| | | | 709/204 |
| 2017/0116813 A1 | 4/2017 | Marincola et al. | |
| 2017/0118003 A1 | 4/2017 | Qu et al. | |
| 2017/0192745 A1 | 7/2017 | Sunstrum | |
| 2017/0238079 A1 | 8/2017 | Smith et al. | |
| 2018/0204565 A1 | 7/2018 | Cohen et al. | |
| 2019/0034157 A1* | 1/2019 | Steinberg | G06Q 10/10 |
| 2019/0166444 A1 | 5/2019 | Goldstein | |
| 2020/0244790 A1 | 7/2020 | Sun | |
| 2021/0007162 A1* | 1/2021 | Pöllänen | H04W 76/45 |
| 2022/0408120 A1* | 12/2022 | Lazar | H04N 21/234309 |
| 2023/0014760 A1* | 1/2023 | Martin | H04W 4/90 |

* cited by examiner

SYSTEM AND METHOD FOR EXTERNAL COMMUNICATIONS TO/FROM RADIOS IN A RADIO NETWORK

FIELD

Embodiments of the invention relate to systems that enable radio messages originating in a radio network to be transformed into text and subsequently broadcast via a plurality of communications media to recipients in other, non-radio communications networks, and the message recipient in the other, non-radio network can communicate via text or audio with the radio user in the radio network without the necessity of having a radio.

BACKGROUND

The following discussion includes information that may be useful in understanding embodiments of the invention. It is not an admission that any of the information provided herein is prior art or relevant to the present invention, or that any publication specifically or implicitly referenced is prior art.

Companies and individuals continuously desire to become more effective and efficient at performing and completing work tasks. Providing workers with appropriate tools for completing their assigned tasks is a critical element of productivity.

Certain communications networks have conventionally remained closed to other networks. For example, radio networks do not conventionally interconnect with networks that send and receive text messages, e.g., email systems. This lack of interconnectivity between networks essentially requires that duplicative systems be employed if actors primarily engaged in one network should communicate with actors in another network. Thus, gaps in communication networks are created and/or some actors simply cannot communicate with other actors even though both actors are members of the same organization (e.g., same corporation, same police force, etc.).

In the spirit of industrial efficiency expert Frederick Winslow Taylor and with an eye for increasing workplace efficiency, it is appropriate to reconsider the extent to which traditional workplace office arrangements could be improved by application of new technologies, particularly the communications technologies that have evolved since the late $19^{th}$ Century when the Taylorists were actively designing the workspaces that have been conventional for more than a century.

In short, a need exists for more advanced workspaces and equipment that can enable workers to perform conventional tasks at an improved rate of performance over the approaches found in the prior art, as well as perhaps tackling new tasks.

SUMMARY OF THE INVENTION

Embodiments of the invention provide a system and method that enables multiple networks themselves based on different underlying communications technologies to be combined into a larger network that provides seamless communications between the different networks. For example, embodiments of the invention enable users in a radio network (e.g., push-to-talk radio systems) to broadcast messages to users in a non-radio network (e.g., users on personal computers or mobile phones) with the radio messages translated into text, different audio formats, and/or or other message formats as necessary. Similarly, text and audio originating from users in a non-radio communications network (e.g., users on personal computers or mobile phones) may be communicated to users in radio networks with the text translated into audio messages and/or audio transcoded into a format suitable for a radio network. Specialized hardware may be employed to facilitate the connections between the radio systems and the non-radio computing systems. In some embodiments, the text may be translated into audio messages via an intermediary computerized system in a cloud architecture. Similarly, the cloud-based computing system may translate audio messages into text for transmission to radio networks for broadcast.

BRIEF DESCRIPTION OF THE DRAWINGS

Figures provided herein may or may not be provided to scale. The relative dimensions or proportions may vary.

DETAILED DESCRIPTION OF AN EMBODIMENT OF THE INVENTION

Embodiments of the invention enable an expanded communications network that bridges conventional radio device networks (e.g., push-to-talk radios) with other non-radio networks, such as a conventional text-based intranet (e.g., an internal corporate messaging service, e-mail service, etc.). The system that enables this expanded communication network may include intermediate processing devices that enhance and/or translate the messages transmitted between the various actors in the network.

Thus, embodiments of the invention provide a communications system that enables the ability to send messages (text/voice messages) using computer/web/third-party apps to push-to-talk audio devices (e.g., radios), and the communications system further enables the push-to-talk devices to send original audio messages to PC/mobile/web/third-party apps that may be converted into text or audio messages. Thus, the communication system allows audio messages to be converted into text and text messages converted into audio for transmission over two different communications systems (e.g., radio and PC) such that two otherwise disparate networks may become effectively unified into a larger network.

In terms of a specific embodiment, the communication system allows a user to send messages to push-to-talk devices (e.g., radio or walkie-talkie devices) from third party apps, such as Slack. Embodiments of the invention also allow the user to send a text message from a particular text-based device (e.g., a computer) and have that message broadcasted to a Push-to-talk radio network.

Figure 1:
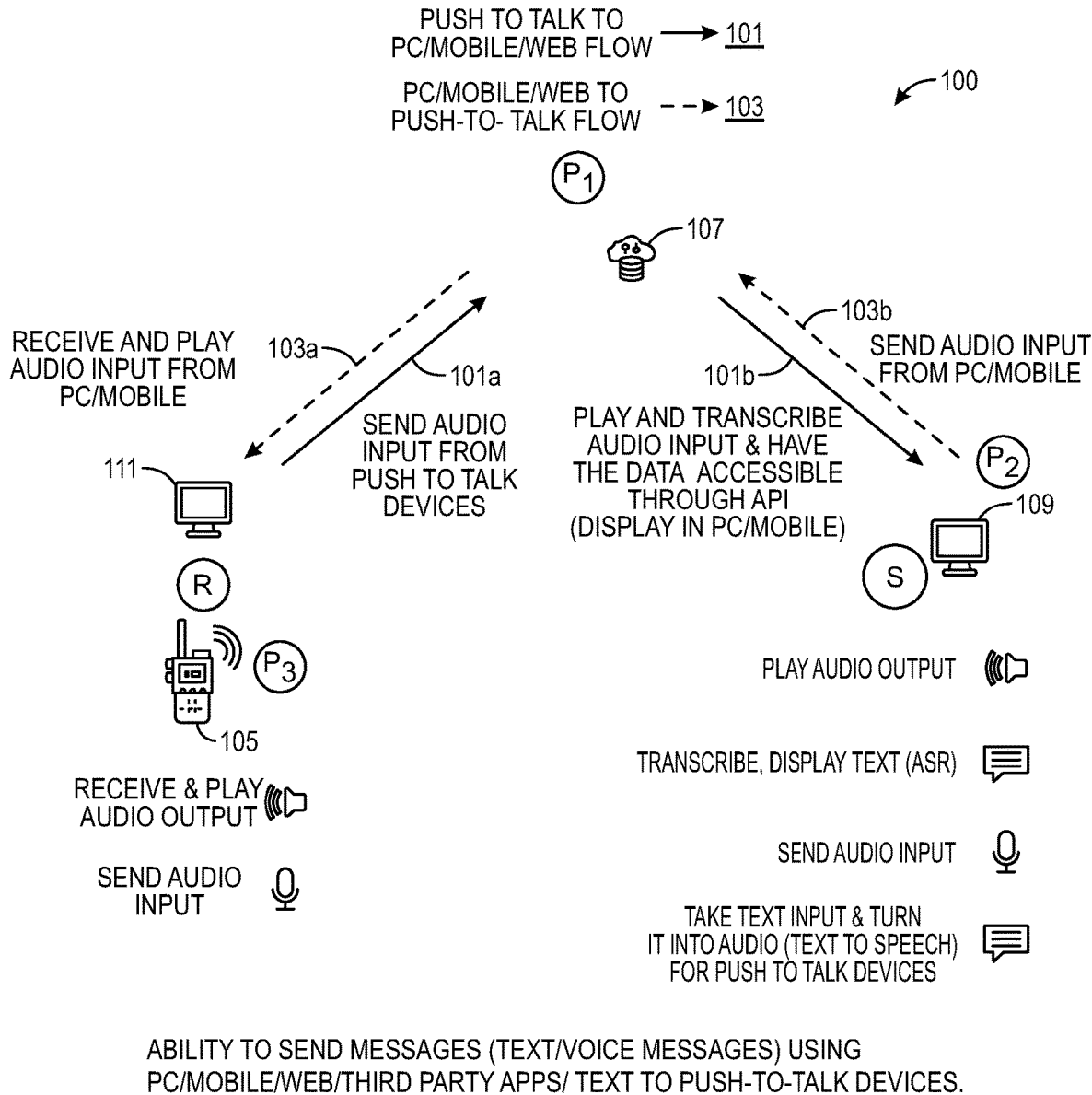
FIG. 1 illustrates a communication network 100 comprising one or more radios 105 (e.g., push-to-talk radios) in a radio network connected to a computing device 111 in communication with a non-radio communication network that communicates audio inputs originating in the radios 105 to one or more computers 109, also in a non-radio network, such that the audio inputs originating from the radios 105 arrive at the computer 109 in a format such as text.

FIG. 1 illustrates a communication network 100 comprising one or more radios 105 (e.g., push-to-talk radios) in a radio network connected to a computing device 111 in communication with a non-radio communication network that communicate audio inputs originating in the radios 105 to one or more computers 109, also in a non-radio communications network, such that the audio inputs originating from the radios 105 may arrive at the computer 109 in a format such as text. The computing device 111 may, for example, be a mobile phone, and is configured to access a non-radio communications network, such as the Internet. The computing device 111 enables the radios 105 to communicate with a server computer 107 through which messages from the radios 105 pass on their way to the computer 109. The radios 105 are connected to the computing device 111 using the wiring shown in FIGS. 02-06. There may be more than one computer 109 connected to the server computer 107, and there may be more than one computing device 111 connected to the server computer 107.

Similarly, text messages originating from the computer 109 in the non-radio communication network may be transmitted to the radios 105 in the radio network where they are played as audio messages on one or more of the radios 105. In some embodiments, the messages sent from the computer 109 may originate as audio messages, albeit likely having a different audio encoding than used in the radios 105. Likewise, the audio messages from the radios 105 may be played as audio messages on the computer 109 albeit likely in a different audio encoding than originally transmitted from the radios 105. The computer 109 may comprise many forms of computing devices, such as personal computing devices such as PCs and mobile phones.

Figure 2:
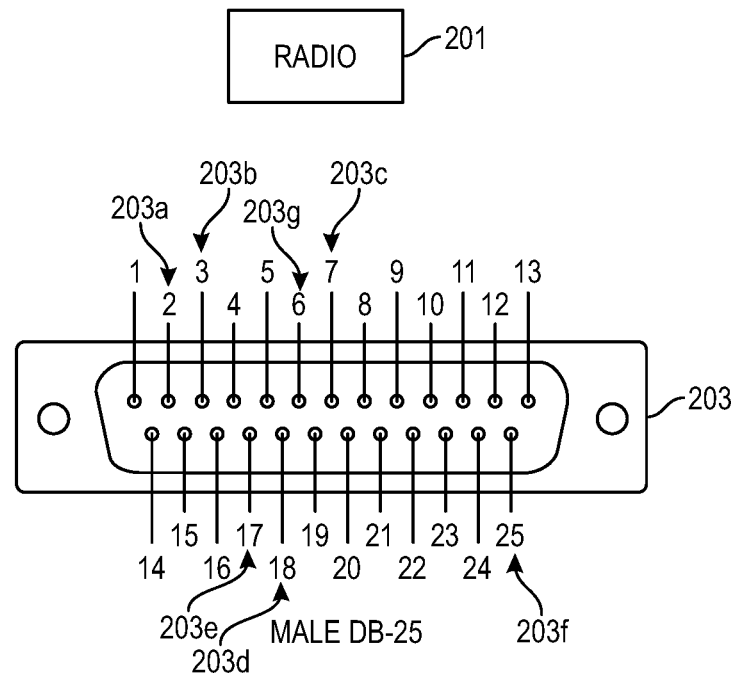
FIG. 2 illustrates hardware that enables the transmission of data through the communications network 100 shown in FIG. 1, according to an embodiment of the invention.
Figure 2:
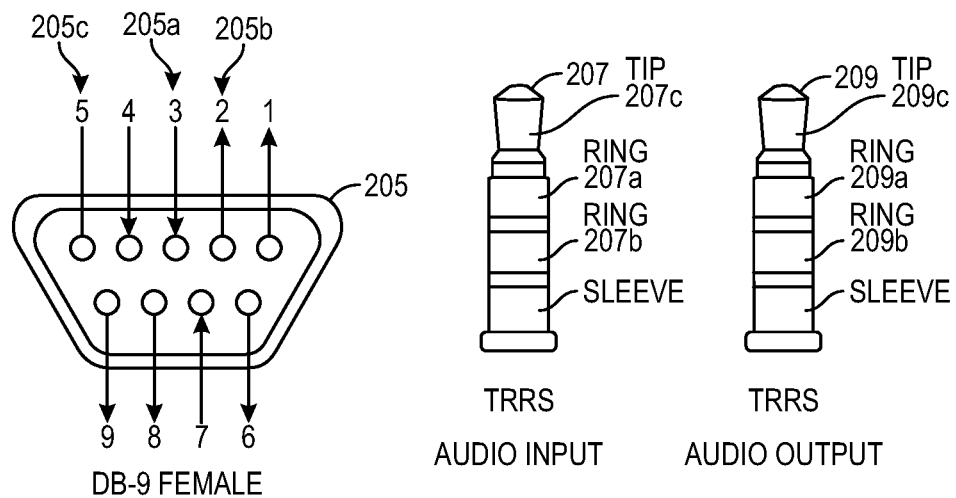
Figure 2:
Figure 3:
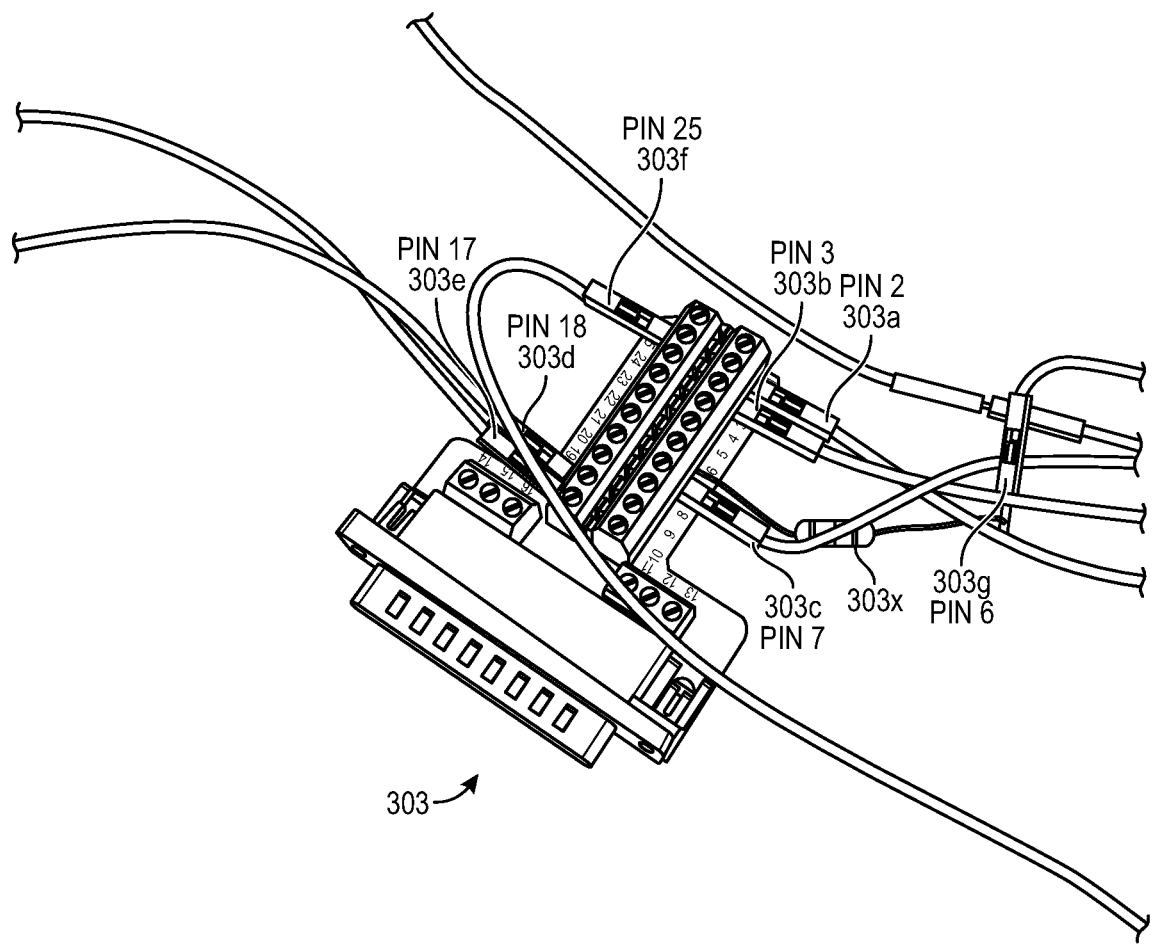
FIG. 3 through FIG. 5 illustrate breakout versions of the connectors illustrated in FIG. 2.
Figure 4:
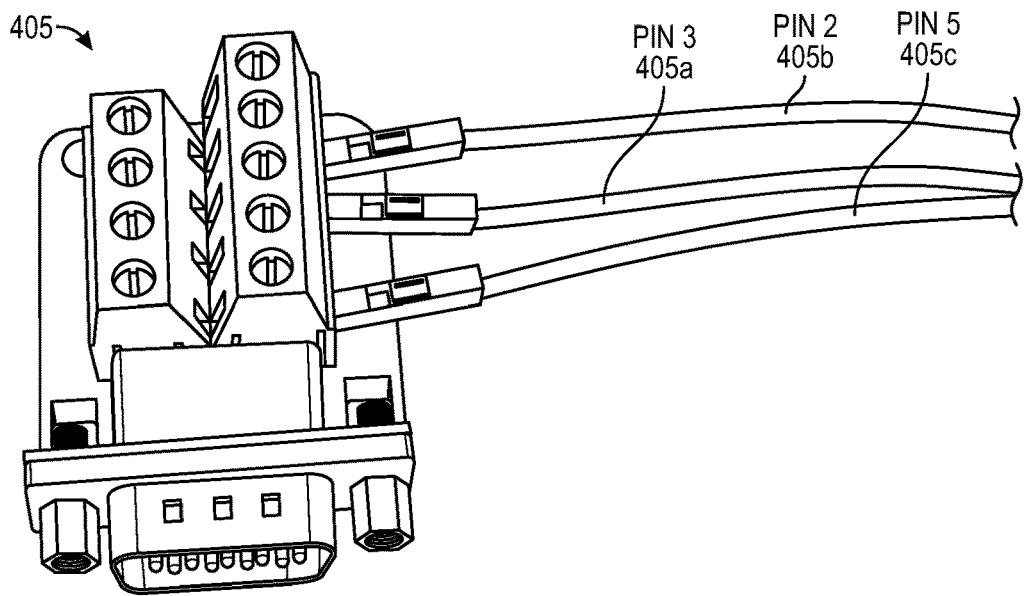

One or more radios 105 are connected to a computing device 111 through wired connectors (exemplary embodiments of such wired connections are shown in FIG. 2, 3, 4, 5, 6) enabling transmission of data over audio input ports (enabling computing device 111 to receive audio inputs from the radios 105), audio output ports (enabling computing device 111 to send audio outputs to the radios 105) and serial ports (enabling computing device 111 to send signals to control and configure the radios 105).

Audio messages from the radios 105, after being routed through computing device 111, are transmitted to the computer 109 through a server computer 107. The server computer 107 translates the audio messages from the radios 105 into text suitable for transmission to the computer 109. The subsequently translated text is then transmitted from the server computer 107 to the computer 109. This transmission may transpire in several different forms including SMS alerts, messages sent to third-party software or renderings displayed on a website. The server computer 107 may be a server computer hosted by online webhosting services (e.g., a cloud hub) or a server computer available on a local network.

Similarly, text messages originated from the computer 109 are transmitted to the server computer 107 where the server computer 107 transforms the text messages into audio messages. The messages may be transmitted to the server computer 107 over SMS, through third-party software or over a website. The subsequently translated audio messages are then transmitted from the server computer 107 to the computing device 111 which transmits them to radios 105 over its audio output connection. If the server computer 107 has received sufficient audio characteristics for the creator of the text message from the computer 109, then the text message may be translated not only into audio but into an audio voice that resembles the creator of the text message. In a dense communications network, this further enables listeners on the radios 105 to discern one voice from another.

The following example illustrates an embodiment of the communication network 100 in operation. Assume Person S associated with the computer 109 has no radio communications hardware available (e.g., one of the radios 105) but desires to send a radio message nevertheless to Person R who only has a radio 105 that is capable of receiving radio messages (e.g., one of the radios 105).

While Person S does not have a radio 105, Person S does have access to the computer 109, and the hardware and specialized software configuration shown in FIG. 1 that includes the server computer 107. For example, the server computer 107 may include support for third-party software and hardware integrations $P_1$ via webhooks configured to maintain persistent connections with peripheral devices, such as the computer 109. A webhook is an HTTP-based callback function that allows lightweight, event-driven communications between two application programming interfaces (APIs), e.g., one API in the computer 109 paired with another API in the server computer 107. As an ordinary artisan would understand, webhooks provide one technical solution for an automated messaging capability upon the occurrence of an event and send messages over the Internet to a unique URL.

Webhooks may augment or alter the behavior of a webpage or web application by providing custom callbacks. These callbacks may be maintained, modified, and managed by third-party users and developers who may not necessarily be affiliated with the originating website or application. Webhooks provide an extremely fast notification system, much like SMS notifications. Alternative communications technologies to webhooks are also available to provide similar persistent connections between devices, such as the computer 109 and the server computer 107.

As mentioned, the persistent hardware/software configuration $P_1$ in the server computer 107 is paired with a similarly persistent hardware/software configuration $P_3$ in the computing device 111 that is paired with one or more radios 105. The hardware/software configuration $P_3$ has been configured for operations on hardware devices that run on a variety of operating systems, e.g., Windows, MacOS, Linux, Android, etc. The software portion of $P_3$ operates on the computing device 111.

The hardware/software configuration $P_3$ with computing device 111 also supports serial communication for accessing Person R's radio 105. The serial communications are conventionally RS-232, although other configurations are possible, and sending and receiving audio data to and from the radio 105, such as TRS and TRRS connectors.

Returning to the communication example, Person S initiates a radio communication to Person R by providing the message content (e.g., "Hello World"). The message content may be either created as a text message prepared in any of the ways that text messages can be prepared on a conventional computer 109 or may be prepared as an audio message in a format permitted by the computer 109 and its pertinent software $P_2$.

Software in $P_2$ and operating in the computer 109 transmits the message via a customized application programming interface (API) associated with $P_1$ that employs HTTP requests and/or by a website designed for the purpose of communicating with such an API. As another alternative, $P_1$ could receive the message from the computer 109 by SMS/MMS or by a third-party applications such as Slack. These alternative communications means may themselves employ webhooks. For example, in the case of Slack or in the case of SMS/MMS, services such as Twilio provide the dedicated webhooks. In embodiments that include these integrations, the relevant text or audio message is received by the integrated communications mechanism (e.g., the hardware/software that transmits the message) as part of a payload (the part of transmitted data that is the actual intended message) that has been sent as part of the webhook.

Person S also provides $P_2$ with additional metadata that describes the radio(s) 105 to receive the transmitted message. Person S may specify this metadata to $P_2$ at runtime using an API or through configuration files that can be preset on a data server associated with $P_2$. The metadata can include information about which specific radios 105 should receive the message, the kind of voice to use for TTS synthesis (as described above), the priority of the message, and other similar customization data.

Thus, Person S may target multiple radios 105 in the radio network to receive the message based on many different criteria including targeting specific radios, radios within a specific organization, radios configured to receive a specific kind of message, etc. Person S may also target radios 105 at various levels of granularity, e.g., from sending a message to all radios 105 connected (indirectly through computing device 111) to the server computer 107 at the time or to sending a message to all radios 105 connected to a specific computing device 111 or to sending a message to exactly one specific radio 105 being held by a specific organizational subset (e.g., the radio 105 operated by worker 012 in sector 7). As mentioned above, one or more radios 105 are connected to the computing device 111 through wired connectors (exemplary embodiments of such wired connections are shown in FIG. 2, 3, 4, 5, 6) enabling transmission of data over audio input ports, audio output ports, and serial ports, as needed.

If $P_1$ receives the message from person S in text, then $P_1$ engages a text-to-speech synthesizer that converts the message to an audio file. $P_1$ may employ any number of conventional text-to-speech converters to complete this task, and the text-to-speech synthesizer may either be bundled with $P_1$ or accessed by $P_1$ as a separate utility. As mentioned, different synthesizers may be employed and may be configurable for different genders, accents, etc. In some embodiments, the text-to-speech synthesizer may even access a data file that allows it to create synthetic audio messages that resemble the voice of person S. An ordinary artisan should understand the operation of conventional text-to-speech synthesizers.

After $P_2$ has prepared the audio message for transmission to the server 107/software $P_1$, $P_2$ then engages the transmission of the message using a communications protocol such as the ones described above.

As mentioned above, Person S may provide $P_2$ with either an audio message or a text message. If Person S provides a text message, it is transmitted (with its metadata) from $P_2$ to $P_1$ which synthesizes the message in audio as specified in the metadata provided by Person S. $P_1$ comprises the software running on server 107. In some embodiments, $P_2$ does not necessarily comprise a software package but could be a combination of different things including SMS, Slack, a website, etc. that is employed to allow Person S to communicate back and forth with server 107 and $P_1$.

Thus, at this point in processing Person S's message, $P_1$ has an audio file (either through the synthesizer or by extracting it from content provided by Person S. $P_1$ then converts the audio file to a file format associated with a lossy audio coding format such as Opus (e.g., as defined in RFC 6716). $P_1$ may employ a transcoding process (e.g., direct digital-to-digital conversion of one encoding to another) to make the conversion. In addition, $P_1$ may have an organic transcoding process or $P_1$ may engage software such as ffmpeg to perform the transcoding or by writing specific handlers for audio files based on their encoding formats (e.g., codecs).

In addition, $P_1$ may ensure that the audio message (e.g., an OPUS recording) is transcoded into a closed (e.g., proprietary) format to provide security that prevents intercepted recordings from being played back by third parties. An ordinary artisan understands how to create a file format that is not an open file format, although highly advanced encryption techniques may be employed as desired.

$P_1$ operating on the server computer 107 may also encode the message for transmission to reduce the size of the payload (EP) being sent to the computing device 111.

Using the additional metadata provided by Person S (e.g., what channel to send the message on and the configuration of the server computer 107, $P_1$ determines which connected device (e.g., the relevant computing device 111 connected to a radio 105) should receive the recorded message. $P_1$ sends the audio message with additional data that is necessary for playing the audio message (e.g., sample rate of the audio, number of channels in the audio etc.) and instructions about which radio 105 to play the audio on to $P_3$.

After determining the relevant computing device 111 to which to transmit, $P_1$ performs this transmission by sending the relevant data over a persistent websocket connection. Websockets are a communication protocol allowing for persistent two-way communication across two computers (in this case computing device 111 and server 107). $P_1$ and $P_3$ are configured to establish and maintain a persistent websocket connection thereby enabling this communication. The connection between the computing device 111 and the server 107 should be persistent to ensure that real-time communication can occur between these two computing devices, and websockets enable this persistence. Websockets are one technology that enables a persistent connection between computing devices, which is a key technical attribute for the connection between $P_1$ and $P_3$, according to an embodiment of the invention.

The computing device 111 include specialized software $P_3$ that is configured to extract the audio portions of received messages and play them back to radios 105 using hardware configurations such as those described in FIGS. 2-6.

On the radio side, Person R is at one or several radios 105 connected to the computing device 111 running specialized software $P_3$. The radios 105 should be configured to receive audio data as well as serial commands to key up the radio 105 to prepare the radio 105 for receiving audio data input. When the specialized software $P_3$ receives a command to play back a received audio recording, $P_3$ parses this command to confirm that the command contains all the relevant information necessary for this playback, e.g., the encoded recording payload (EP), and the additional playback information (sample rate, which radio to play back on etc.).

The specialized hardware/software $P_3$ begins processing the parsed command by first decoding the encoded payload (EP) and then transcoding the proprietary format file (as discussed above) into a conventional format such as raw pulse-code modulation (PCM) data. If necessary, $P_3$ may then resample the PCM data to a different sample rate that can be played back on the radio 105, which may be needed since certain radios may not support specific sample rates, with 48000 Hz and 44100 Hz being typically supported by most radios. Additionally, $P_3$ may also attenuate/amplify the raw PCM data to an appropriate volume for the radio playback if the received message include a command to do so and/or if $P_3$ has been pre-configured to do so for the specific radio models. $P_3$ may also perform additional processing steps including normalization/noise cancellation/equalization as necessary to improve the audio output quality on the radio 105 with these behaviors being controlled similarly to the attenuation/amplification.

$P_3$ also maintains a queue of received audio messages that are to be played back on each radio 105 connected to $P_3$. When $P_3$ completes processing for a received message, $P_3$ then enqueues the raw PCM data of the recording for playback on the specific radio(s) 105 targeted to receive the message. $P_3$ determines if the radio 105 is free to receive signals by communicating over a serial connection and determining that the radio 105 is not currently in use. When the radio 105 is free to receive signals, $P_3$ keys up the radio 105 using serial commands for receiving audio and the relevant PCM data is passed to the radio 105 over an appropriate audio cable (e.g., a 3.5 mm audio cable). Once $P_3$ completes the audio clip's playback, $P_3$ keys down the radio 105 using serial commands freeing the radio 105 up for other use or playback of additional audio clips.

When $P_3$ receives multiple audio clips for playback, these audio clips are queued and played back sequentially. Such queuing may occur if several messages are sent at the same time by Person S or if a message is received while a previously sent message is in the process of being played.

In the reverse situation where Person R wants to send a message to Person S, $P_3$ receives the initial audio message from a radio 105 associated with Person R. As mentioned, computing device 111 which is running $P_3$ is connected to the radios 105 via a series of serial ports and audio ports. The serial port enables $P_3$ to interact with the radio 105 by sending commands to key up and key down the radio 105 preparing connected transceivers to receive audio. The audio connections enable $P_3$ to send and receive raw PCM data from the radio.

As noted, the server computer 107 includes software $P_1$ that can convert audio messages to text messages. The server computer 107 may include one or more computers having access to software that can convert text messages to audio messages. As mentioned, the computers in the server computer 107 may also have access to a reference database that allow the conversion to audio to be in the voice of the sender of the text message.

The software employed in the server computer 107 for automatic speech recognition (ASR) may take a variety of forms, as known to the artisan of ordinary skill. For example, Google, Microsoft, and Amazon provide products that may be employed. Some embodiments of the invention may suggest different approaches for further customizing ASR software and/or specialized training for the ASR systems. As mentioned, $P_1$, is the software running on the server compute 107. In some embodiments, $P_2$ might not be a dedicated software package but could be a combination of different things including SMS, Slack, a website, etc. whose primary function is to allow Person S to communicate back and forth with $107/P_2$. The application programming interface (API) endpoints for all metadata (e.g., Audio, text, timestamps) allows the data to be accessed from web in all types of devices.

Thus, the communications network 100 bridges a radio network comprised of the radios 105 with a computer network 109, merging two networks in a seamless manner than allows users to send and receive communications in a manner matching that of the communications equipment at their immediate disposal.

FIG. 2 illustrates hardware that enables the transmission of data through the communications network 100 shown in FIG. 1. In some embodiments of the invention, a new conductor may be fabricated to be able to SEND audio through any radio channel, e.g., on the radios 105 shown in FIG. 1.

The hardware illustrated in FIG. 2 allows the radio 201 (e.g., the radios 105 shown in FIG. 1) to communicate with the local computer 211 (e.g., the computing device 111 shown in FIG. 1) on three different ports:

1. A serial port through a DB9 connector 205,
2. An audio input port (this allows the radio to send audio input to the local computer) through a TRRS connector 207, and
3. An audio output port (this allows the local computer to output audio to the radio) through a TRRS connector 209.

In some embodiments, such as on Kenwood NX-900/NX-901, these connections are achieved by connecting a DB25 connector 203 (DB25 connectors may have different specs for different radios so these pinouts may vary) to the radio 201 and wiring its ports as follows to the various connectors, and as shown in FIG. 2:

1. DB9 205
   a. Pin 2 203*a* on DB25 203 is connected to Pin 3 205*a* on DB9 205
   b. Pin 3 203*b* on DB25 203 is connected to Pin 2 205*b* on DB9 205
   c. Pin 7 203*c* on DB25 203 is connected to Pin 5 205*c* on DB9 205
2. Audio Input 207
   a. Pin 18 203*d* on DB25 203 is connected to either Ring 207*a*, 207*b* on the TRRS connector 207
   b. Pin 17 203*e* on DB25 203 is connected to Tip 207*c* on the TRRS connector 207
3. Audio Output 209
   a. Pin 6 203*g* on DB25 203 is connected to either Ring 209*a*, 209*b* on the TRRS connector 209
   b. Pin 25 203*f* on DB25 203 is connected to Tip 209*c* on the TRRS connector 209

In some embodiments of the invention, such as the Kenwood example above, the Audio Output connector 209 also has a 33 kΩ resistor (shown in FIG. 3 as 303*x*) added on it. The reason for this value of resister is that sending an unmodulated signal may damage the radio 105 and this resistor sufficiently limits the voltage to prevent damage to the radio 105.

Figure 5:
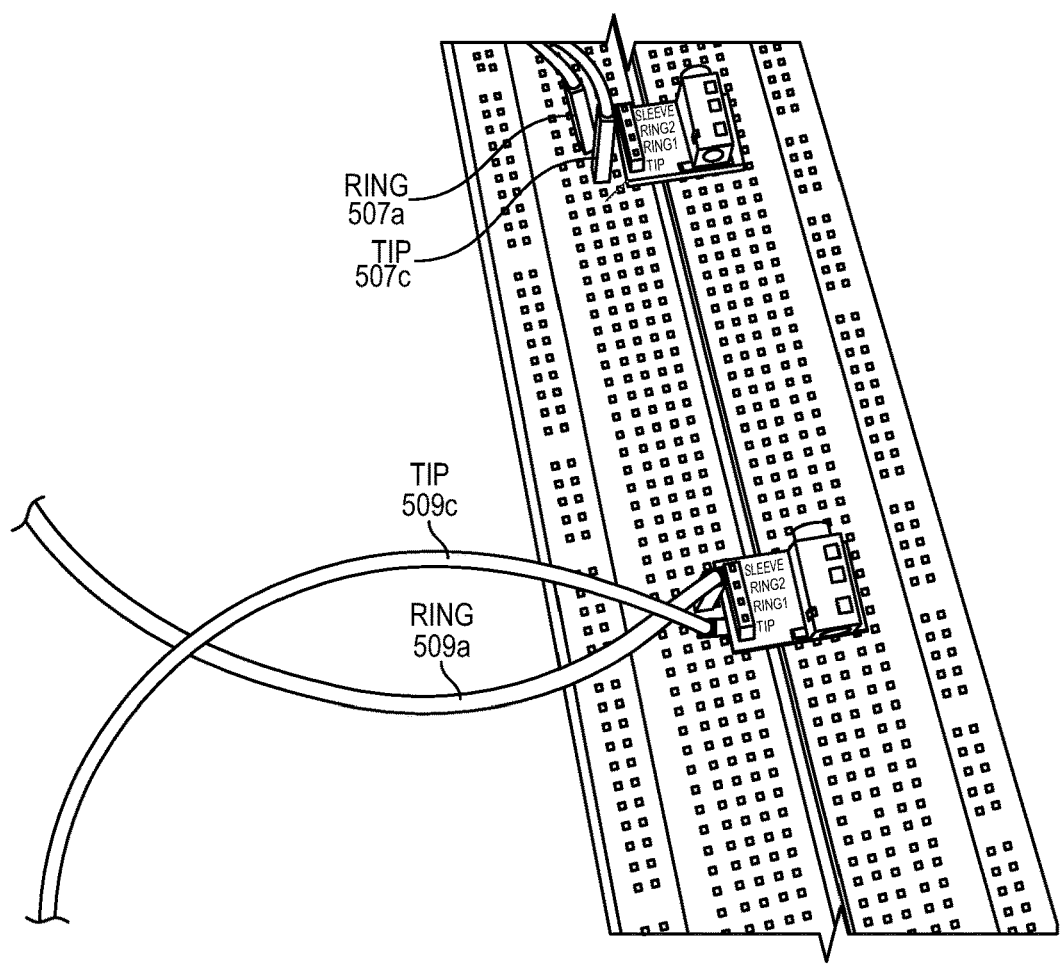
Figure 6:
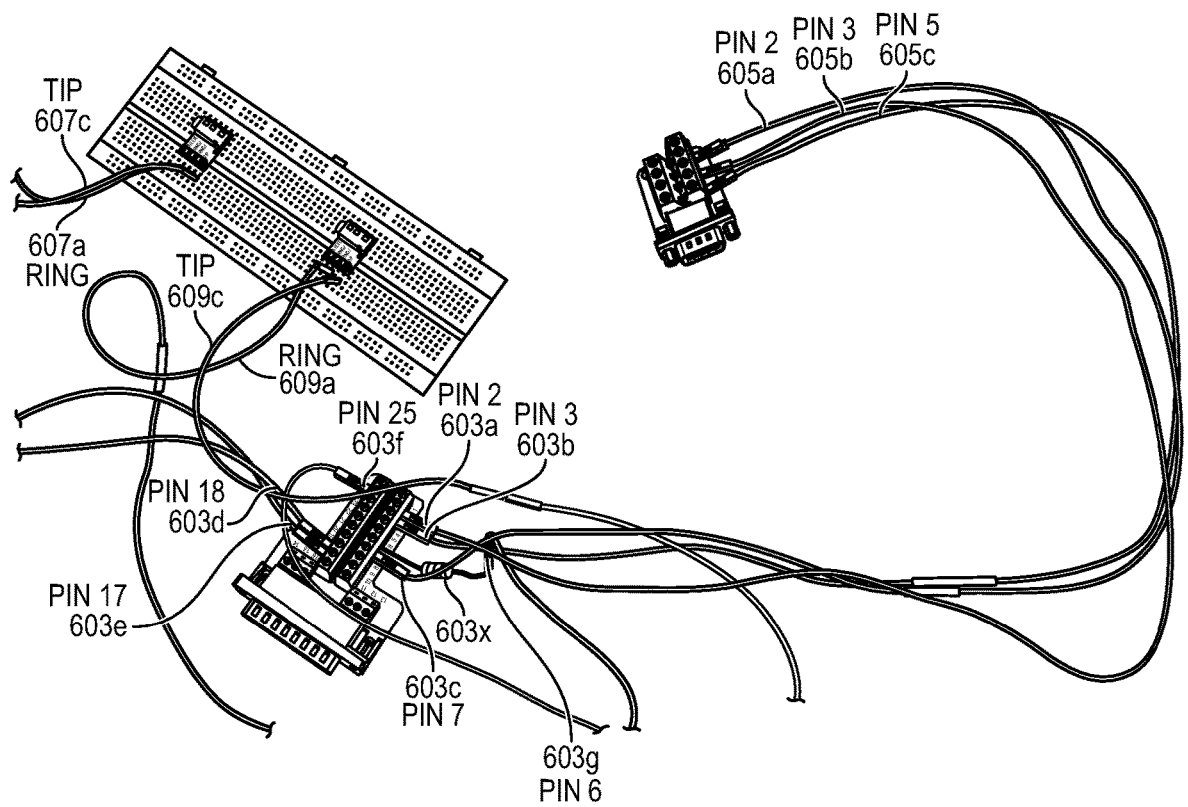
FIG. 6 illustrates the full wiring setup for a connector such as that illustrated in FIG. 2.

FIG. 3 through FIG. 6 illustrate breakout versions of the connectors illustrated in FIG. 2. These breakout versions provide for easier wiring. The connector 303 shown in FIG. 3 corresponds to the connector 203 shown in FIG. 2, and the connections 303*a*-303*g* correspond to the connections 203*a*-203*g*. The connector 405 shown in FIG. 4 corresponds to the connector 205 shown in FIG. 2, and the connections 405*a*-405*c* correspond to the connections 205*a*-205*c*. In FIG. 5, the ring components 507*a* and 509*a* correspond to the ring components 207*a* and 209*a* shown in FIG. 2, and the tip components 507*c* and 509*c* correspond to the tip components 207*c* and 209*c* shown in FIG. 2. The components shown in FIG. 6 correspond to their respective components from FIG. 3 to FIG. 5. FIG. 6 illustrates the full wiring setup for the connector.

FIG. 3 through FIG. 6 illustrate breakout versions of the connectors illustrated in FIG. 2. These breakout versions provide for easier wiring. FIG. 6 illustrates the full wiring setup for the connector.

Embodiments of this invention may interoperate with various other systems. To that end, the following patent application is incorporated herein by reference in its entirety: U.S. application Ser. No. 17/153,908, published as US 2021/0227355 A1, entitled "System And Method For Data Publication Classification Analytics For Communications In Walkie—Talkie Network," naming Ishtiaq Mahmud Rahman and Francis G. Lacson as inventors.

Various embodiments of the invention have been described in detail with reference to the accompanying drawings. References made to particular examples and implementations are for illustrative purposes and are not intended to limit the scope of the invention or the claims.

Many types of electronic components may be employed in the devices discussed above. For example, in various embodiments, the mobile telephone may include microelectronics, nanoelectronics, micro-circuitry, nano-circuitry and combinations thereof. It should be apparent to those skilled in the art that many more modifications of the mobile telephone and other devices besides those already described are possible without departing from the inventive concepts herein.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention.

It should be noted that while many embodiments of the invention described herein are drawn to a smart wireless mobile telephone, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed mobile telephone.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the terms "ambient noise" and "ambient sound" have been used synonymously. Similarly, "sound" and "noise" have been used synonymous, except where the context shows a difference in meaning, e.g., "meaningful sound from mere noise." Likewise, "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A communication system, comprising:
a plurality of radios forming a first communication network, wherein the first communications network is a radio network, wherein each radio of a plurality of radios operates in a half-duplex mode that provides point-to-point communications directly to radios of the plurality of radios;
a computing device in the first communication network configured to receive analog audio messages from the plurality of radios in the radio network and configured to convert the received analog audio messages to a digital audio message format, wherein the computing device is physically wired to at least one radio of the plurality of radios by at least one serial connection;
a plurality of computing systems configured to send text forming a second communication network, wherein the second communication network is a non-radio network;
an intermediary computing system configured to translate audio messages into translated audio-to-text messages and configured to translate text into translated text-to-audio messages,
wherein audio messages transmitted from the first communication network by the computing device are received by the intermediary computing system and translated into the translated audio-to-text messages and sent to the second communication network, and
wherein text from the second communication network is received by the intermediary computing system and translated into the translated text-to-audio messages and transmitted to the first communication network for receipt by a radio of the plurality of radios in an analog format for broadcast over the radio network to at least one radio of the plurality of radios.

2. The communications system of claim 1 wherein a computing system of the plurality of computing systems in the second communication network sends a text message via the non-radio network to the intermediary computing system, wherein the intermediary computing system translates the text message to a translated test-to-audio message and sends the translated text-to audio message to the first communication network where the translated text-to-audio message is prepared for broadcast to at least one radio of the plurality of radios in the first communication network by the computing device.

3. The communications system of claim 2 wherein the at least one radio of the plurality of radios is configured to relay audio from another radio of the plurality of radios to the computing device in the first communication network that is configured for communications to the intermediary computing system.

4. The communication system of claim 3 wherein the at least one radio of the plurality of radios is physically connected by multiple serial connections to the computing device in the first communication network.

5. The communication system of claim 4, wherein physical connections between the at least one radio of the plurality of radios and the computing device in the first communication network, comprises:
   a serial port connection in the computing device using a DB9 connector;
   an audio input port connection in the computing device through a first TRRS connector; and
   an audio output port in the computing device through a second TRRS connector.

6. The communication system of claim 5, wherein the physical connections between the at least one radio of the plurality of radios and the computing device in the first communication network, comprises a DB25 connector further comprising:
   Pin 2 on the DB25 connector is connected to Pin 3 on the DB9 connector;
   Pin 3 on the DB25 connector is connected to Pin 2 on the DB9 connector;
   Pin 18 on the DB25 connector is connected to a ring on the second TRRS connector to receive audio in the at least one radio of the plurality of radios;
   Pin 17 on the DB25 connector is connected to a tip on the second TRRS connector to receive audio in the at least one radio of the plurality of radios;
   Pin 6 on the DB25 connector is connected to a ring on the first TRRS connector that outputs audio to the at least one radio of the plurality of radios; and
   Pin 25 on the DB25 connector is connected to the tip on the first TRRS connector that outputs audio to the at least one radio of the plurality of radios.

7. The communication system of claim 3 wherein the computing device in the first communication network is configured to employ webhooks in communications with the intermediary computing system.

8. The communication system of claim 3 wherein the computing device in the first communication network is configured to receive a plurality of translated text-to-audio messages from the intermediary computing system and wherein the computing device is further configured to queue playback of the received translated text-to-audio messages to at least one radio of the plurality of radios such that the received translated text-to-audio messages are played to the at least one radio of the plurality of radios in a first received first played order.

9. The communications system of claim 1 wherein the intermediary computing system is configured to receive a text message from a computer of the plurality of computing systems via a communications protocol of at least one SMS, MMS, and Slack.

10. The communications system of claim 9 wherein the communication protocol employs a webhook.

11. The communications system of claim 1 wherein the intermediary computing system receives an audio message having a first audio encoding from a computer of the plurality of computing systems and wherein the intermediary computing system converts the first audio encoding into a second audio encoding, wherein the radio network operates in the second audio encoding.

12. The communications system of claim 1 wherein the intermediary computing system receives a text message from a computer of the plurality of computing systems and also receives metadata from the computer of the plurality of computing systems, wherein the metadata identifies a speaker voice to associate with the text message, wherein the intermediary computing system converts the text message into a translated text-to-audio message having the speaker voice.

13. The communication system of claim 1 wherein the intermediary computing system is configured to convert an audio file to an audio file format associated with a lossy audio coding format.

14. The communication system of claim 13 wherein the lossy audio coding format comprises an Opus format as defined in RFC 6716.

15. The communication system of claim 1 wherein the intermediary computing system is configured to employ a transcoding process that performs a direct digital-to-digital conversion of one encoding to another.

16. The communication system of claim 15 wherein the intermediary computing system is further configured to engage an ffmpeg utility to perform the transcoding.

17. The communication system of claim 1, wherein at least one computing system of the plurality of computing systems is further configured to send audio messages having a first audio encoding from the second communication network to the intermediary computing system, wherein the first audio encoding is unsuitable for broadcast in the radio network, wherein the intermediary computing system translates received audio messages having the first audio encoding into audio messages having a second audio encoding that is suitable for broadcast in the radio network, and wherein the intermediary computing system transmits the audio messages translated into the second audio encoding to the first communication network for receipt by the radio of the plurality of radios in the analog format for broadcast over the radio network to the at least one radio of the plurality of radios.

18. The communication system of claim 1 wherein at least one computing system of the plurality of computing systems in the second communication network is further configured to replay audio messages having a first audio encoding, wherein the first audio encoding is unsuitable for broadcast in the radio network, wherein the intermediary computing system receives audio messages form the first communication network, wherein the received audio messages have a second audio encoding that is suitable for broadcast in the radio network but unsuitable for audio replay in the second communication network, wherein the intermediary computing system translates the received audio messages from the second audio encoding to the first audio encoding suitable for audio replay by the at least one computing system of the plurality of computing systems in the second communication network, and wherein the intermediary computing system sends audio messages translated into the first audio encoding to the second communication network for audio replay by the at least one computer of the plurality computing systems.

* * * * *